US012645734B2

(12) United States Patent
Nauman et al.

(10) Patent No.: US 12,645,734 B2
(45) Date of Patent: Jun. 2, 2026

(54) BIOMETRIC SENSOR SYSTEMS AND METHODS FOR AUDITORY APPLICATIONS

(71) Applicant: State Farm Mutual Automobile Insurance Company, Bloomington, IL (US)

(72) Inventors: Olivia Nauman, Phoenix, AZ (US); Lauren Mitchell, Phoenix, AZ (US); James Rodriguez, Goodyear, AZ (US); Ivan Gutierrez, Laveen, AZ (US); Anish Agarwal, Bloomington, IL (US); Ruben Tequida, Phoenix, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/975,878

(22) Filed: Dec. 10, 2024

(65) Prior Publication Data

US 2025/0307310 A1      Oct. 2, 2025

Related U.S. Application Data

(60) Provisional application No. 63/570,147, filed on Mar. 26, 2024.

(51) Int. Cl.
*G06F 16/638* (2019.01)
*G06N 5/022* (2023.01)

(52) U.S. Cl.
CPC .......... *G06F 16/639* (2019.01); *G06N 5/022* (2013.01)

(58) Field of Classification Search
CPC ............................. G06F 16/639; G06N 5/022
See application file for complete search history.

(56) References Cited

U.S. PATENT DOCUMENTS

| | | | |
|---|---|---|---|
| 10,048,931 B2 | 8/2018 | Vartakavi et al. | |
| 10,078,691 B2 * | 9/2018 | Zhang ................... | G06V 40/70 |
| 11,451,870 B1 * | 9/2022 | Panchaksharaiah ........................ H04N 21/44226 |
| 2014/0074479 A1 * | 3/2014 | Kassam ................. | G10L 25/48 704/270 |
| 2014/0119564 A1 | 5/2014 | Caskey et al. | |
| 2016/0371372 A1 * | 12/2016 | Chong ................... | H04H 60/65 |
| 2018/0314959 A1 * | 11/2018 | Apokatanidis ........... | G06N 5/04 |
| 2019/0142350 A1 * | 5/2019 | Bastide ................. | G16B 50/00 600/300 |
| 2024/0054159 A1 * | 2/2024 | Roy ...................... | G06F 16/632 |
| 2024/0134905 A1 * | 4/2024 | Saavedra Plata ....... | G06F 3/165 |
| 2024/0181876 A1 * | 6/2024 | Larsson ................. | B60K 35/00 |

* cited by examiner

*Primary Examiner* — Jared M Bibbee

(74) *Attorney, Agent, or Firm* — Armstrong Teasdale LLP

(57)      ABSTRACT

A computer-implemented auditory biometric method generates a playlist file including at least one audio file. The method includes receiving user biometric data and applying user biometric data to a trained auditory biometric model to generate a playlist file. The auditory biometric model may be trained using training data including a plurality of historic records associated with a plurality of historic users. The method may include transmitting a playlist message including the playlist file to a user computer device for execution by the user computer device.

20 Claims, 8 Drawing Sheets

300

302 RETRIEVING USER BIOMETRIC DATA

304 DETERMINING A PLAYLIST BASED ON USER BIOMETRIC DATA

306 TRANSMITTING A PLAYLIST MESSAGE TO USER COMPUTER DEVICE

308 RETRIEVING UPDATED USER BIOMETRIC DATA

310 DETERMINING AN UPDATED PLAYLIST BASED ON UPDATED USER BIOMETRIC DATA

312 TRANSMITTING AN UPDATED PLAYLIST MESSAGE TO USER COMPUTER DEVICE

300

320 BUILDING A FIRST TRAINING DATASET

322 TRAINING IN A FIRST SESSION AN AB MODEL USING THE FIRST TRAINING DATASET

324 BUILDING A SECOND TRAINING DATASET

326 RE-TRAINING IN A SECOND SESSION THE AB MODEL USING THE SECOND TRAINING DATASET

328 APPLYING MODEL INPUTS TO THE AB MODEL

BIOMETRIC SENSOR SYSTEMS AND METHODS FOR AUDITORY APPLICATIONS

CROSS-REFERENCED TO RELATED APPLICATIONS

This application claims the benefit of priority to U.S. Provisional Patent Application Ser. No. 63/570,147, filed Mar. 26, 2024, and entitled "Biometric Sensor Systems and Methods Auditory Applications" the entire contents and disclosures of which are hereby incorporated by reference herein in their entirety.

FIELD OF THE DISCLOSURE

The present disclosure relates to biometric sensor systems and methods for auditory biometric applications and, more particularly, to systems and methods for generating unique and customized playlists for targeting a user and the user's biometric response.

BACKGROUND

Music may impact a person's mood or physiological state. For example, listening to relaxing music may lower your heart rate, blood pressure, or relieve stress, improve mood, induce sleep, or promote an energized state. Persons may select songs to be included in a playlist for a specific activity (e.g., a running playlist), having a list of songs that the user likes or enjoys listening to while running. A few known computer applications may allow users to request a generic playlist having a list of songs for running with an upbeat or fast tempo, or certain rhythm. Similarly, a few known applications may generate a generic playlist including calm or soothing music with a slow tempo to create a calming effect to reduce stress prior to bedtime or during meditation.

While specific types or genres of music may elicit a physiological or emotional state of a person, these effects may be uniquely dependent on the person and their physiological or biometric state. Conventional systems and methods may not generate user specific playlists, in real-time, based upon the user's physiological state. Conventional techniques may include additional inefficiencies, encumbrances, ineffectiveness, and/or other drawbacks as well.

BRIEF SUMMARY

The present embodiments may relate to, inter alia, a computer-implemented auditory biometric method for outputting a playlist file including at least one audio file. The method may include receiving user biometric data and applying user biometric data to a trained auditory biometric model to generate a playlist file. The auditory biometric model may be trained using training data including a plurality of historic records associated with a plurality of historic users. The method may include transmitting a playlist message including the playlist file to the user computer device for execution by the user computer device.

In one aspect, an auditory biometric computer system for outputting a playlist file comprising at least one audio file may be provided. The auditory biometric system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and/or other electronic or electrical components, which may be in wired or wireless communication with one another. In one instance, the auditory biometric computer system may include at least one processor, and at least one memory in communication with the at least one processor. The at least one processor may be programmed to: (i) receive user biometric data detected by a sensor associated with a user computer device, wherein user biometric data is associated with a biometric state of a user; (ii) apply user biometric data to a trained auditory biometric model to generate model outputs comprising the playlist file, wherein (a) the auditory biometric model is trained using training data including a plurality of historic records associated with a plurality of historic users, and/or (b) the historic records each include a historic audio file and historic user biometric data of a user associated with a user computer device that played the historic audio file; and/or (iii) transmit a playlist message including the playlist file to the user computer device for execution by the user computer device. The auditory biometric system may include additional, less, or alternate functionality, including that discussed elsewhere herein.

In another aspect, a computer-implemented auditory biometric method for outputting a playlist file comprising at least one audio file may be provided. The auditory biometric system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and/or other electronic or electrical components, which may be in wired or wireless communication with one another. In one instance, the auditory biometric method may be implemented using a computer device including a processor in communication with a memory device. The auditory biometric method may include: (i) receiving user biometric data detected by a sensor associated with a user computer device, wherein user biometric data is associated with a biometric state of a user; (ii) applying user biometric data to a trained auditory biometric model to generate model outputs comprising the playlist file, wherein (a) the auditory biometric model may be trained using training data including a plurality of historic records associated with a plurality of historic users, and/or (b) the historic records each include a historic audio file and historic user biometric data of a user associated with a user computer device that played the historic audio file; and/or (iii) transmitting a playlist message including the playlist file to the user computer device for execution by the user computer device. The auditory biometric method may include additional, less, or alternate functionality, including that discussed elsewhere herein.

In yet another aspect, at least one non-transitory computer-readable storage medium including computer-executable instructions embodied thereon for outputting a playlist file comprising at least one audio file may be provided. The at least one non-transitory computer-readable storage medium including computer-executable instructions embodied thereon may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and/or other electronic or electrical components, which may be in wired or wireless communication with one another. When executed by at least one processor, the computer-executable instructions may cause the processor to: (i) receive user biometric data detected by a sensor associated with a user computer device, wherein user biometric data may be associated with a biometric state of a user; (ii) apply user biometric data to a trained auditory biometric model to generate model outputs comprising the playlist file, wherein (a) the auditory biometric model may be trained using training data including a plurality of historic records associated with a plurality of historic users, and/or (b) the historic records may each include a historic audio file and historic user biometric data of a user associated with a user computer device that played the historic audio file; and/or (iii) transmit a playlist message including the playlist file to the user computer device for execution by the user computer device. The at least one non-transitory computer-readable storage medium including computer-executable instructions may include additional, less, or alternate functionality, including that discussed elsewhere herein.

In one aspect, an auditory biometric computer system for outputting a playlist file comprising at least one audio file may be provided. The auditory biometric system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and/or other electronic or electrical components, which may be in wired or wireless communication with one another. In one instance, the auditory biometric computer system may comprise at least one processor, and at least one memory in communication with the at least one processor. The at least one processor may be programmed to: (i) build a training dataset including a plurality of historic records associated with a plurality of historic users, wherein the plurality of historic records each include a historic audio file and historic user biometric data of a historic user of the plurality of historic users having a user computer device that played the historic audio file; (ii) train an auditory biometric model using the training dataset; (iii) receive user biometric data detected by a sensor associated with a user computer device, wherein user biometric data may be associated with a biometric state of a user; (iv) apply user biometric data to the trained auditory biometric model to generate model outputs comprising the playlist; and/or (v) transmit a playlist message including the playlist to the user computer device for execution by the user computer device. The auditory biometric system may include additional, less, or alternate functionality, including that discussed elsewhere herein.

In another aspect, a computer-implemented auditory biometric method for outputting a playlist file comprising at least one audio file may be provided. The auditory biometric system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and/or other electronic or electrical components, which may be in wired or wireless communication with one another. In one instance, the auditory biometric method may be implemented using a computer device including a processor in communication with a memory device. The method may include: (i) building a training dataset including a plurality of historic records associated with a plurality of historic users, wherein the plurality of historic records each include a historic audio file and historic user biometric data of a historic user of the plurality of historic users having a user computer device that played the historic audio file; (ii) training an auditory biometric model using the training dataset; (iii) receiving user biometric data detected by a sensor associated with a user computer device, wherein user biometric data may be associated with a biometric state of a user; (iv) applying user biometric data to the trained auditory biometric model to generate model outputs comprising the playlist; and/or (v) transmitting a playlist message including the playlist to the user computer device for execution by the user computer device. The auditory biometric method may include additional, less, or alternate functionality, including that discussed elsewhere herein.

In yet another aspect, at least one non-transitory computer-readable storage medium including computer-executable instructions embodied thereon for outputting a playlist file comprising at least one audio file may be provided. The at least one non-transitory computer-readable storage medium including computer-executable instructions embodied thereon may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and/or other electronic or electrical components, which may be in wired or wireless communication with one another. When executed by at least one processor, the computer-executable instructions may cause the processor to: (i) build a training dataset including a plurality of historic records associated with a plurality of historic users, wherein the plurality of historic records each include a historic audio file and historic user biometric data of a historic user of the plurality of historic users having a user computer device that played the historic audio file; (ii) train an auditory biometric model using the training dataset; (iii) receive user biometric data detected by a sensor associated with a user computer device, wherein user biometric data is associated with a biometric state of a user; (iv) apply user biometric data to the trained auditory biometric model to generate model outputs comprising the playlist; and/or (v) transmit a playlist message including the playlist to the user computer device for execution by the user computer device. The at least one non-transitory computer-readable storage medium including computer-executable instructions may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein.

Figure 1:
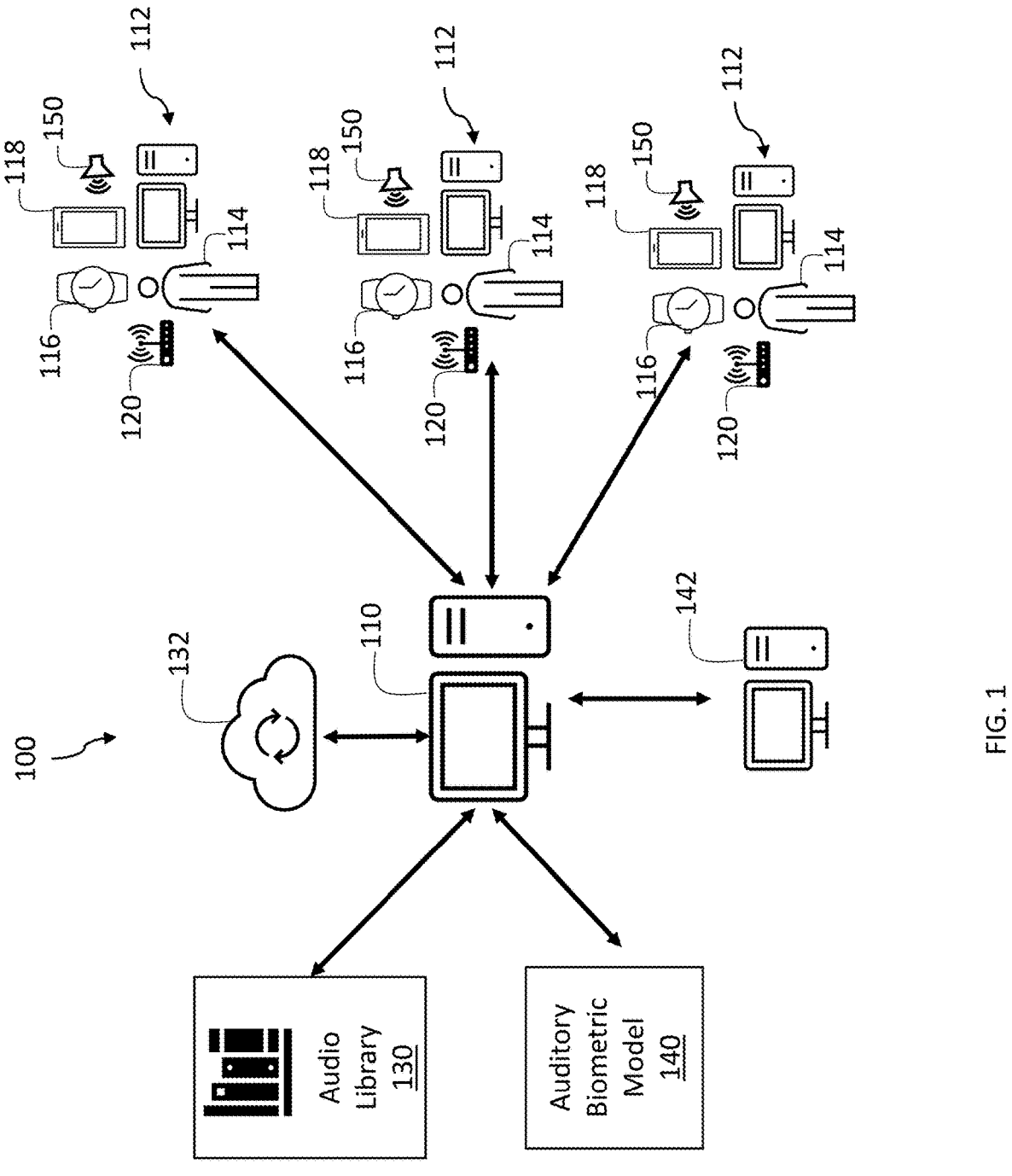
FIG. 1 illustrates a schematic diagram of an exemplary auditory biometric system for generating a customized playlist.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for generating a unique user specific playlist including one or more songs or audio files, based upon user data including measured user biometric parameters, user selected inputs, and/or additional or alternative user data. The system includes a biometric auditory system which utilizes real-time data processing to evaluate measured biometric parameters to generate a playlist which elicits a desired or targeted biometric state of the user, such as a desired heart rate. The auditory biometric system may continuously update the playlist in real-time, for example, between each song, using real-time feedback of the user's biometric state. The biometric auditory system may be enabled to generate unique and user specific playlists for a plurality of different users. The biometric auditory system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and/or other electronic or electrical components, which may be in wired or wireless communication with one another.

In the exemplary embodiments described herein, the auditory biometric system may be associated with a system computer device that is communicatively coupled to one or more user computer devices associated with an enrolled or participating user such that the system computer device may receive, in real-time, measured user biometric data detected by one or more sensors supported by the user computer device. User biometric data may broadly refer to any parameter associated with the user and/or is detectable by the user computer device, for example and without limitation, heart rate, heart rate variability (HRV), body or skin temperature, skin conductivity, skin moisture or sweat, breathing rate, blood oxygen levels (e.g., $O_2$ Saturation), step rate/number, motion data, acceleration, speed, Global Positioning System (GPS) data, blood pressure, $VO_2$ max, calories burned, step count, sleep/awake detection, chronotypes, circadian rhythm, electric heart rate or electrocardiogram.

In some embodiments, the user computer device may be a cellular phone, a smart phone, a tablet computer, laptop, etc. In various embodiments, the user computer device may be a biometric wearable device (e.g., a biometric wrist band, a chest band, ring, watch, smart glasses, and/or patch). The user computer device may be any suitable computer device having one or more sensors enabled to detect user biometric data and/or user data. In some embodiments, the user computer device is associated with a vehicle.

The auditory biometric system may be associated with one or more auditory biometric models (AB models) for generating one or more model outputs, including the playlist, when one or more model inputs are applied. Model inputs may include user biometric data, user selected inputs, and/or user data.

The model inputs may be applied to the model in real-time to generate model outputs in real-time. For example, the model inputs may include user biometric data measured by the sensors in real-time (generally referred to as current model inputs or current user biometric data). Model outputs may include a playlist generated in real-time which is tailored to the user's current biometric state.

In some embodiments, the model may be trained, in a first session, using a plurality of historic user data associated with historic songs and/or music listened to by historic users and the historic user's biometric state while listening to the historic songs and/or music. In certain embodiments, the auditory biometric system re-trains or retunes the model in one or more second sessions, using user specific data (historic user specific biometric data and/or historically played music data) collected over a training period of time. Additionally or alternatively, the auditory biometric system may train, re-train, or tune a user specific model by increasing weighting factors for historic user specific data. The auditory biometric system may generate one or more activity specific models, trained using historic user data having a type of user biometric data associated with a specific activity (e.g., cardio, lifting, sleeping, studying, etc.).

In at least one embodiment described herein, a user may begin a cardio workout session (e.g., a running session or a weight-lifting session) and the auditory biometric system may receive, or retrieve, user data (e.g., user biometric data, user inputs and/or alternative user data) indicative of the start of a session (e.g., a change in heart rate of the user). The auditory biometric system may evaluate the user data (e.g., using a trained model described herein), to generate a playlist to be transmitted to the user's computer device.

The auditory biometric system may generate a playlist that is curated to motivate the user listening to the playlist to achieve or maintain a desired or user selected target biometric state. For example, the playlist may include songs having a range of fast tempos, or a playlist having songs with sequentially increased tempo, causing a user listening to the music to have an increased heart rate or motivation for the cardio session.

In certain embodiments, user inputs may include a target heart rate and/or target duration, e.g., a heart rate and duration that the user wishes to achieve during their workout. The auditory biometric system may apply updated model inputs (e.g., currently measured user biometric parameters) to generate songs to be added to the playlist, to encourage the user to achieve their desired target biometric state (e.g., a target heart rate).

In at least one embodiment described herein, a user may begin a bedtime routine and the auditory biometric system may receive, or retrieve, user data (e.g., user biometric data, user inputs and/or alternative user data) indicative of the start of the routine, e.g., an alarm set by the user. The auditory biometric system may evaluate the user data, e.g., using a trained model described herein, to generate a playlist to be transmitted to the user's computer device.

The auditory biometric system may generate a playlist that is curated to calm the user listening to the playlist to achieve or maintain the target biometric state. For example, the playlist may include songs having a range of slow tempos, or a playlist having songs with sequentially decreasing tempo, causing a user listening to the music to have a decreased heart rate in preparation for falling asleep. In some embodiments, user inputs may include a heart rate or a targeted bedtime. The auditory biometric system may apply updated model inputs (e.g., currently measured user biometric parameters) to generate songs to be added to the playlist, to encourage the user to achieve their desired target heart rate and/or bedtime.

In various embodiments, a user may begin a driving session and the auditory biometric system may receive, or retrieve, user data (e.g., user biometric data, user inputs and/or alternative user data) indicative that the user is driving, e.g., an acceleration detected by a sensor of the user computer device or some other vehicle related telematic and/or the user has selected a driving profile of the auditory biometric system. The driving profile may target a user's biometric state, e.g., a target heart rate or a target breath rate, to ensure that the user stays awake and alert while driving.

In some embodiments, the auditory biometric system may transmit one or more signals to the user computer device causing a volume to be increased or decreased. For example, the model output may include an audio level. In some embodiments, the sensor may include a microphone for detecting surrounding noise data, e.g., sounds in proximity to the user computer device, such as, traffic noises, people speaking, volume levels of surrounding noises, etc. In some embodiments, the auditory biometric system may determine an audio level, based upon the detected surrounding noise data, and transmit a message to the user computer device including instructions which cause the user computer device to adjust a volume to the determined audio level.

In some embodiments, the auditory biometric system may determine, e.g., using the model, one or more health metrics of a user. Health metrics may be utilized for health discounts for a life insurance policy provided by the insurance agency associated with the insurance computer device.

In some embodiments, the auditory biometric system may use and/or receive, or retrieve, a plurality of user data associated with a workout group, e.g., a group of people participating in a workout class, and the auditory biometric system may generate a group playlist, e.g., using aggregated user data, so that the workout group may synch their biometric status and/or their playlist. Group members may opt into or out of these group sessions and/or biometric data of individual users would not be saved or available to the other users, ensuring protection of individual user data or individual biometric data.

At least one of the technical problems addressed by this system may include: (i) generic playlists that are not curated using user specific data; (ii) prior created playlisted which are static and are not updated or adjusted in real-time based upon user specific data, and (iii) playlists that are unable to target a biometric state of the user.

A technical effect of the systems and processes described herein may be achieved by performing at least one of the following steps: (a) receiving user biometric data detected by a sensor associated with a user computer device, wherein user biometric data is associated with a biometric state of a user; (b) applying user biometric data to a trained auditory biometric model to generate model outputs comprising the playlist file, wherein the auditory biometric model is trained using training data including a plurality of historic records associated with a plurality of historic users, wherein the historic records each include a historic audio file and historic user biometric data of a user associated with a user computer device that played the historic audio file; and (c) transmitting a playlist message including the playlist file to the user computer device for execution by the user computer device.

The technical effect achieved by this system may be at least one of: (i) utilizing a person's measured biometric parameters to generate a user specific playlist; and (ii) generate a playlist to target a specific biometric state as selected by the user.

Exemplary Computer System

FIG. 1 depicts a schematic illustration of an exemplary auditory biometric (AB) system, indicated generally at 100, for generating a custom playlist. AB system 100 may include a system computer device 110 that is communicatively coupled to one or more user computer devices 112 associated with one or more participating users 114. System computer device 110 may be embodied as a web server communicatively coupled to the user computer devices 112.

In some embodiments, system computer device 110 may be communicatively coupled to a plurality of different user computer devices 112 associated with a single user 114. For example, system computer device 110 may communicate with both a wearable electronic device 116 in addition to a mobile cellular device 118 used by and/or associated with a single user 114. The wearable electronic device 116 may be embodied as a wrist band (e.g., a fitness bracelet, chest band, smart glasses, smart watch, and the like), a ring, a patch (e.g., an electronic dermal patch), a scale, a blood pressure monitor, a heart rate monitor, a glucose monitor, and/or any other suitable device enabled to detect and/or collect user biometric data.

User computer devices 112 may include one or more sensors 120 for detecting sensor data in real-time. Sensor data may include user biometric data and/or any suitable user data. User biometric data may refer to any physical or behavioral characteristics of user 114. For example, and without limitation, user biometric data may include heart rate, heart rate variability (HRV), body or skin temperature, skin conductivity, skin moisture or sweat, breathing rate, blood oxygen levels (e.g., $O_2$ Saturation), step rate/number, motion data, acceleration, speed, Global Positioning System (GPS) data, blood pressure, $VO_2$ max, calories burned, step count, sleep/awake detection, chronotypes, circadian rhythm, electric heart rate or electrocardiogram. Sensors 120 may include, for example and without limitation, an optical heart sensor, an electric heart sensor, a blood oxygen sensor, a temperature sensor, a moisture sensor, a GPS sensor, an accelerometer, a gyroscope, a microphone, telematics sensors, and/or any suitable sensor.

System computer device 110 may also receive and/or retrieve additional and/or alternative user data from user computer devices 112. For example, system computer device 110 may retrieve or receive user data including calendar data, alarm data, demographic data, pre-existing conditions or medical histories, medications, height/weight data, etc. from user computer device 112. System computer device 110 may also receive and/or retrieve user selected inputs such as feedback regarding songs or playlists or user selected targeted biological states, e.g., calm, energized, or more specific targeted biometric parameters, such as a targeted heart rate, targeted activity time/duration, preference on music genre, liked/disliked songs, or music.

In some embodiments, although a variety of data capture and analysis processes are described in detail below, it will be appreciated that users 114 may opt into and/or opt out of data capture or specific data capture and/or analysis processes, such that the user's 114 privacy is preserved.

Figure 2:
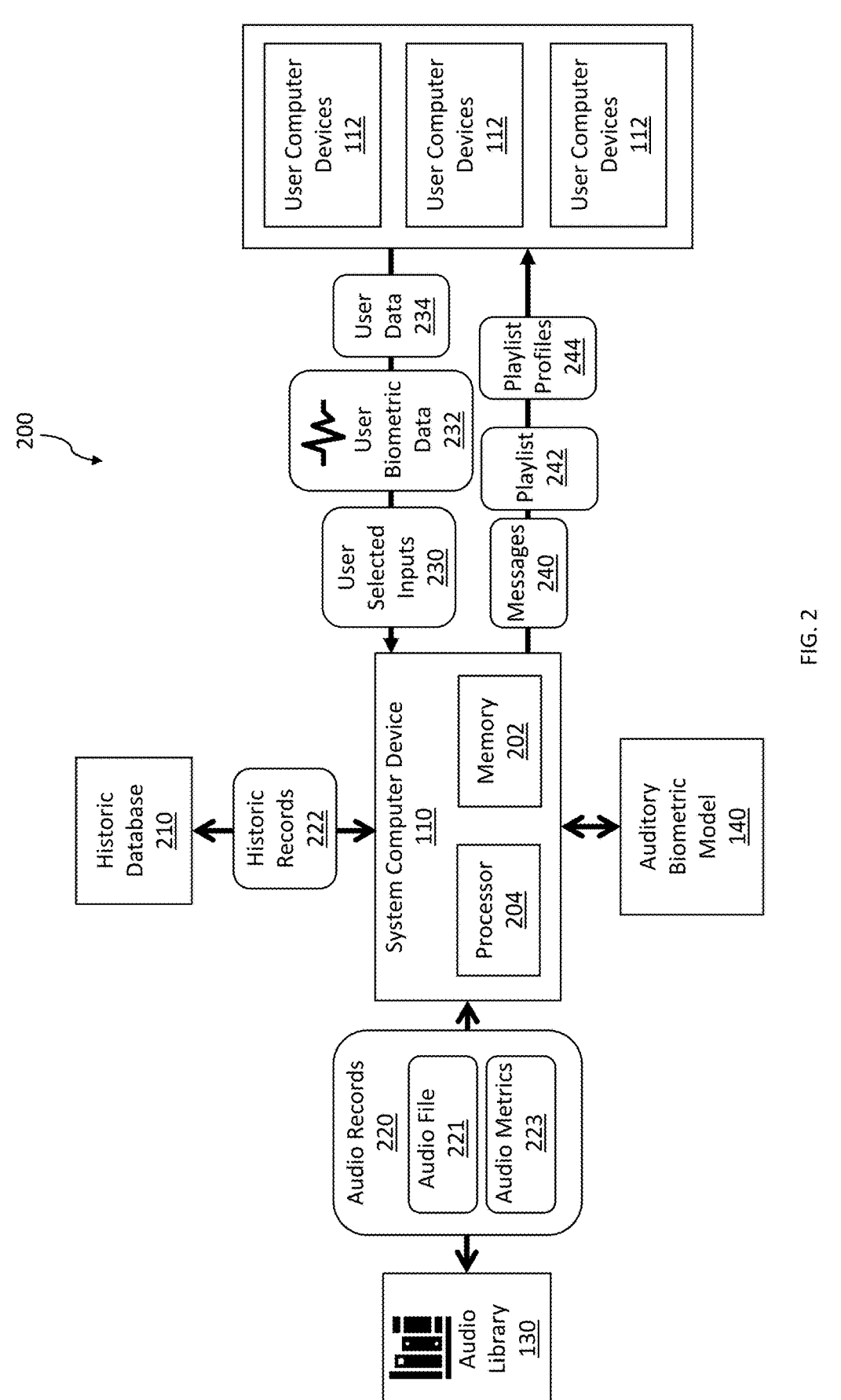
FIG. 2 illustrates a data flow diagram for use with the auditory biometric system shown in FIG. 1.

AB system 100 further may include an audio library 130 including a plurality of songs, music, and/or melodies etc., referred to generally as audio records 220 (see FIG. 2). System computer device 110 may be communicatively coupled to the audio library 130 such that system computer device 110 may retrieve, select, and/or evaluate audio records 220 enabling system computer device 110 to generate a playlist for users 114. AB system 100 may further include a cloud-based storage device 132 for storing any suitable data.

In some embodiments, AB system 100 may include an auditory biometric (AB) model 140 that is trained to generate one or more model outputs when one or model inputs are applied. Model outputs may include the playlist and model inputs may include user data, user selected inputs, and/or user biometric data. System computer device 110 may apply model inputs, in real-time and/or iteratively, to generate new or updated model outputs. For example, system computer device 110 may apply real-time measured user biometric data to AB model 140 to generate the playlist in real-time.

System computer device 110 may transmit one or more messages to user computer devices 112, the messages including the playlist and/or an updated playlist. Messages may include instructions which cause user computer device 112 to play the playlist including one or more songs or audio files using a speaker 150 associated with at least one of user computer devices 112.

In some embodiments, AB system 100 may be associated with, or communicatively coupled to an insurance computer device 142 associated with an insurance agency. Users 114 may be enrolled in an insurance policy with the insurance agency. Additionally or alternatively, health data associated with user biometric data may be used to determine a health scores/status and discounts or rewards may be provided for good health scores/statuses. Users may opt in or out of such features. In the embodiments described herein, the AB system 100 may promote a healthy lifestyle and improve health scores/status, e.g., by encouraging and supporting exercise sessions, reducing stress levels, or staying alert while driving, using the generated playlists.

In some embodiments, AB system 100 may be associated with an application program interface executable on at least one of the user computer devices 112 which may cause user computer device 112 to display one or more graphical user interfaces (GUI) for displaying information and/or data to user 114, e.g., playlist. User's 114 may interact with AB system 100 using the GUI, which may enable users 114 to enroll with AB system 100, upload or input user data and/or user selected inputs. Additionally, and/or alternatively, users 114 may interact with AB system 100 using a web-based interface.

Exemplary Communications Network

FIG. 2 depicts a schematic diagram illustrating an exemplary dataflow diagram 200 for use with AB system 100 shown in FIG. 1. System computer device 110 may include, or is associated with, at least one processor 204 and at least one memory 202. System computer device 110 is communicatively coupled to one or more user computer devices 112.

System computer device 110 may also be communicatively coupled to audio library 130 and/or a historic database 210. System computer device 110 may create and/or store a plurality of audio records 220 to audio library 130. Each audio record 220 may include an audio file 221 (e.g., a song or melody). In some embodiments, each audio record 220 may include additional audio metrics 223 associated therewith, such as, genre, tempo, a range of tempos, such as beats per min or range of beats per min (e.g., andante, moderator, allegretto, allegro, etc.), rhythm, melody, timbre, and/or harmony. In some other example embodiments, audio records 220 may include additional and/or alternative audio metrics 223.

System computer device 110 may create and or store a plurality of historic records 222. Each historic record 222 may include a historic audio file 221 and historic user biometric data 232 associated with biometrics of one or more historic users. Historic biometric data may have been detected by one or more sensors supported by a historic user computer device, at or near the time that the users listened to the historic audio file 221, e.g., at or near the time that the historic user computer device played the historic audio file 221 using speaker 150.

Historic records 222 may include additional and/or alternative data, such as, historic user selected inputs, historic playlist profiles, and/or historic user data. In some embodiments, each historic record 222 may be associated with a single user. Additionally or alternatively, the historic database 210 may store a plurality of historic records 222 each having the same historic audio file 221 but each having different historic user biometric data 232 associated with different historic users. Alternatively, and or additionally, each historic record 222 may be associated with a plurality of users and associated with a single historic audio file 221. Historic records 222 may also be generated for a specific, or current, user 114.

System computer device 110 may exchange a plurality of messages and/or data with a plurality of different user computer devices 112. For example, system computer device 110 may receive and/or retrieve user selected inputs 230, user biometric data 232, and or user data 234. Additionally, and/or alternatively, system computer device 110 may transmit one or more messages or notifications 240 to user computer devices 112. In some embodiments, system computer device 110 may transmit a playlist 242 to user computer devices 112. In some embodiments, system computer device 110 may transmit a playlist profile 244 to user computer device 112. Playlist profiles 244 may include, for example and without limitation, a sleep profile, a waking up profile, a yoga or light exercise profile, a lifting or training profile, driving, and/or a running profile. Other profiles may also be created and stored. Each of the playlist profiles 244 may be associated with a set of audio records 220 that are associated with an activity or a type of activity. Playlist profiles 244 may be associated with a target user biometric state, e.g., a target heart rate or a target average heart rate. For example, the driving profile may be associated with a target heart rate and/or breathing rate to ensure that a driver, e.g., user 114, is awake and alert while driving. In this example, user computer device 112 may be associated with a vehicle and the sensor may detect a parameter of the vehicle while user 114 is driving.

User data 234 may include demographic data, e.g., age, gender, place of residence, occupation, family status, etc.

User data 234 may include body weight, height, resting heart rate, medical conditions, medications, health concerns, and/or other health or biologic data. User data 234 may be provided by user 114 during an enrollment period or updated as needed.

User biometric data 232 may include any parameter associated with user 114 and/or is detectable by user computer device 112, for example and without limitation, heart rate, heart rate variability (HRV), body or skin temperature, skin conductivity, skin moisture or sweat, breathing rate, blood oxygen levels (e.g., $O_2$ Saturation), step rate/number, motion data, acceleration, speed, Global Positioning System (GPS) data, blood pressure, $VO_2$ max, calories burned, step count, sleep/awake detection, chronotypes, circadian rhythm, electric heart rate or electrocardiogram. In some embodiments, user biometric data 232 may be measured by one or more sensors 120 of user computer devices 112. In various embodiments, user biometric data 232 may be determined by system computer device 110 using received sensor data from sensors 120, e.g., system computer device 110 may determine a stress level using sensor data. Additionally or alternatively, user biometric data 232 may be determined by user computer device 112 indirectly from sensor 120 measurements. User selected inputs 230 may include for example and without limitation, a targeted biometric state, such as a targeted heart rate, targeted activity time/duration, preference on music genre, liked/disliked songs, or music.

In some embodiments, system computer device 110 may be associated with, or generates (e.g., trains, tunes, and/or re-trains) AB model 140. AB model 140 may be trained to generate one or more model outputs when one or more model inputs are applied to AB model 140. System computer device 110 may apply model inputs, e.g., re-run, to AB model 140 to generate updated, in-real-time, and/or user specific model outputs associated with user's current biometric state.

Model inputs may include, for example and without limitation, user selected inputs 230, user biometric data 232, user data 234, and/or general data. In some embodiments, model inputs may include additional and/or alternative data, e.g., time of day such as a morning period as a user is awaking or an evening period as a user is preparing for bedtime. Model outputs may include, for example and without limitation, messages 240, playlists 242, and/or playlist profiles 244. General data may include a time of day, a time of year, the day of the week, holidays, and/or local or regional events.

In some embodiments, AB model 140 may be trained during a first training session using a first training dataset. The first training dataset may include historic records 222, for a plurality of different users 114, and/or audio records 220.

In some embodiments, subsequently after AB model 140 was initially trained by the first training dataset in the first training session, AB model 140 may be retrained using historic user data for a specific, e.g., single, user 114. Additionally, and/or alternatively, AB model 140 may be trained, or re-trained, using historic records 222, for a plurality of different users 114, wherein historic records 222 associated with a specific, e.g., single user are weighed more heavily than historic records 222 for other users. Additionally, and/or alternatively, AB model 140 may be generated using user selected inputs 230, e.g., embodied as constraints of AB model 140. Additionally, and/or alternatively, system computer device 110 may filter model outputs using user selected inputs 230. In some embodiments, system computer device 110 may generate a plurality of user specific AB models 140.

In some embodiments, system computer device 110 may generate a plurality of playlist profile specific AB models 140. Each individual playlist profile specific model may be generated using a sorted set of historic records 222 associated with a specific profile activity (e.g., a sleep profile, a waking up profile, a yoga or light exercise profile, a lifting or training profile, and/or a running profile) and/or a specific genre of music.

In some embodiments, AB model may be retrained or updated any suitable number of times to generate a model output including playlist 242 that more accurately generates a target biometric response of a user.

Exemplary Computer-Implemented Methods for Generating a Playlist

Figure 3:
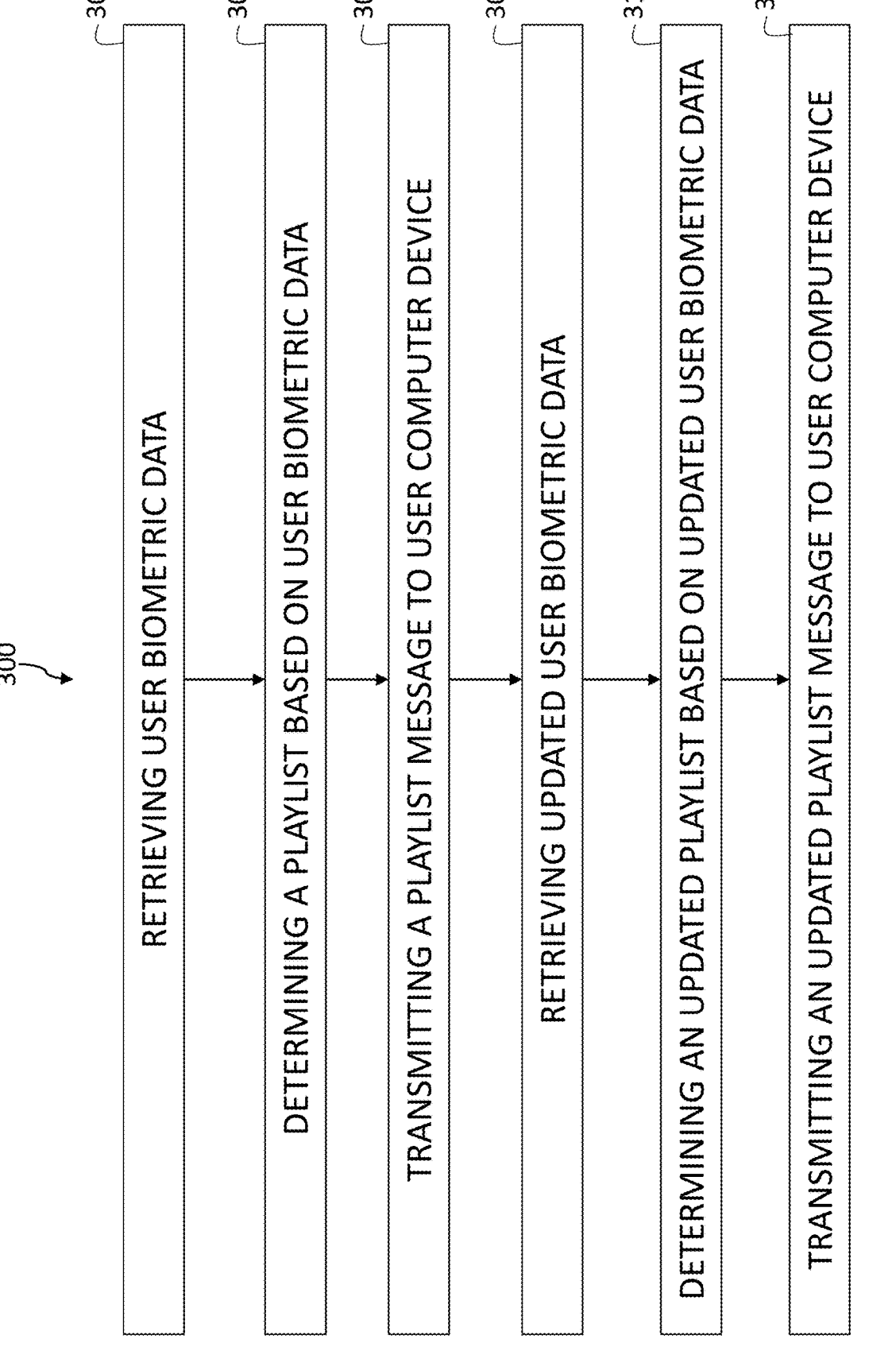
FIG. 3 illustrates a flow chart of an exemplary computer-implemented process for one aspect for use with the auditory biometric system shown in FIG. 1.
Figure 4:
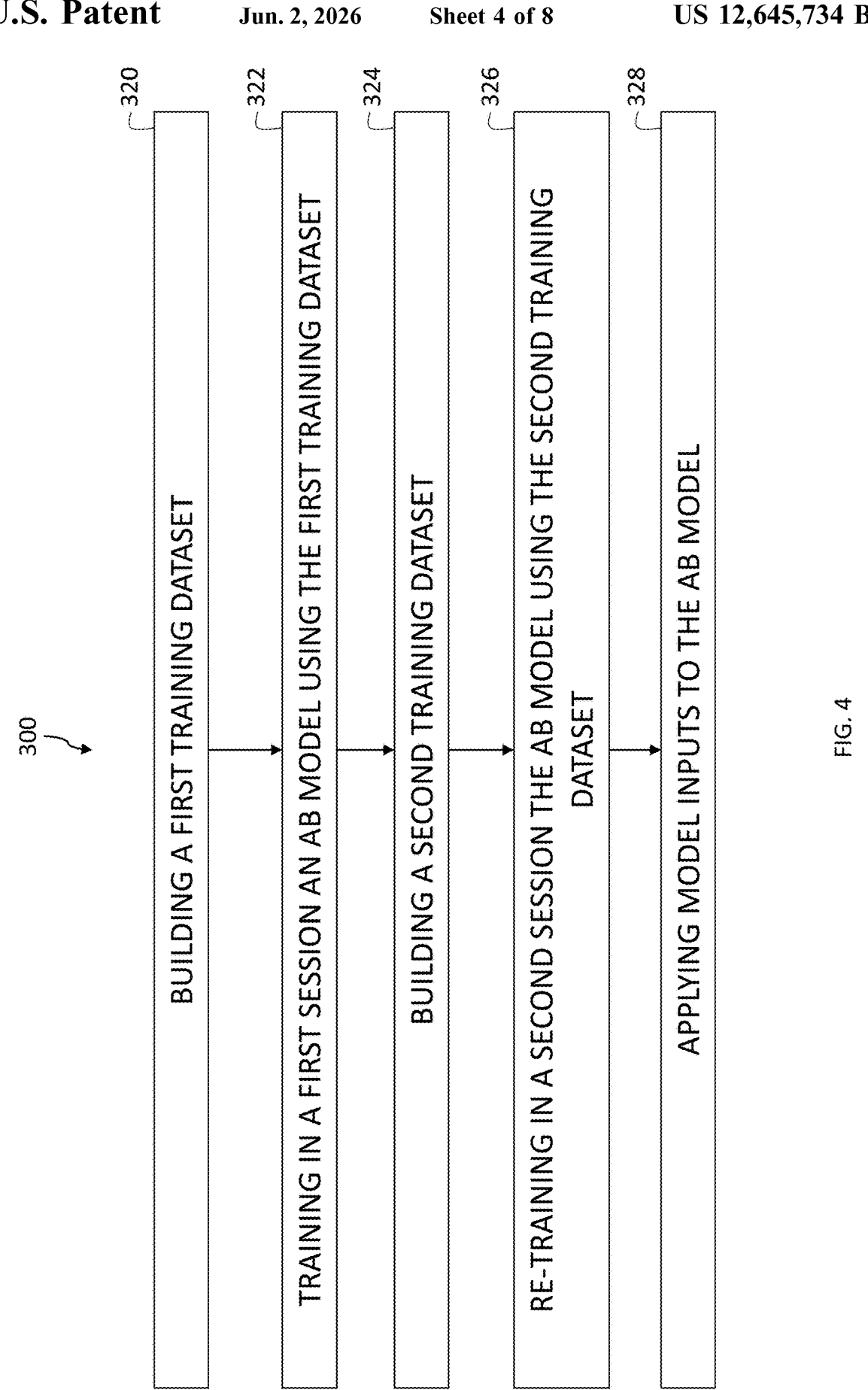
FIG. 4 illustrates a flow chart of another exemplary computer-implemented process for one aspect for use with the auditory biometric system shown in FIG. 1.

FIGS. 3 and 4 depict an exemplary computer-implemented method 300 for use with AB system 100 shown in FIG. 1. One or more steps of method 300 may be executed by any suitable computer device, e.g., system computer device 110.

In some embodiments, method 300 may include system computer device 110 receiving one or more registration messages from one or more user computer devices 112 associated with users 114 enrolling with AB system 100. For example, system computer device 110 may receive an enrollment message from user computer device 112 installing or downloading an application program interface on user computer device 112 and/or synchronizing one or more additional user computer devices 112, e.g., wearable electronic devices 116, mobile cellular devices 118, medical devices, etc., to AB system 100 and/or system computer device 110. Enrollment messages may include user data 234 and/or user selected inputs 230. Enrollment messages may include user biometric data 232, e.g., baseline levels.

In some embodiments, system computer device 110 may receive and/or retrieve input messages from user computer devices 112. The input messages may include user data 234 and/or user selected inputs 230. System computer device 110 may receive and/or retrieve any suitable number and/or with any suitable frequency, input messages, and system computer device 110 may update user data 234 and/or user selected inputs 230 with the most accurate and up to date data.

Method 300 may include system computer device 110 receiving and/or retrieving 302 user biometric data 232, continuously, and/or semi-continuously, from user computer device 112, providing system computer device 110 with real-time feedback of the user's biometric state.

Method 300 may include system computer device 110 determining (or retrieving or generating) 304 playlist 242 using the received user biometric data 232.

Method 300 may include system computer device 110 transmitting 306 a playlist message to user computer device 112, playlist message 240 including playlist 242 including at least one song, e.g., at least one audio file 221.

Method 300 may further include system computer device 110 receiving and/or retrieving 308 updated user biometric data 232, continuously, and/or semi-continuously, from user computer device 112, providing system computer device 110 with updated feedback of the user's biometric state while user computer device 112 is playing playlist 242.

Method 300 may include system computer device 110 determining 310 an updated playlist 242 using updated user biometric data 232. Updated playlist 242 may have one or more audio files 221 that are different than one or more audio files 221 of the initially generated playlist 242.

Method 300 may include system computer device 110 transmitting 312 an updated playlist message to user computer device 112, updated playlist message including updated playlist 242.

Method 300 may be an iterative process, wherein system computer device 110 applies updated model inputs, e.g., as detected by sensors in real-time, to AB model 140 to generate updated model outputs, e.g., new, and updated playlists 242 that have different audio files 221 compared to a prior generated playlist 242. As such, method 300 may include system computer device 110 transmitting 312 any suitable number of updated playlist message to user computer device 112 having an updated playlist, that may be different than a previously generated playlist.

In certain embodiments, method 300 may include system computer device 110 generating or building audio records 220 and/or storing audio records 220 in audio library 130. For example, system computer device 110 may determine one or more metrics genre, tempo, beats per min or range of beats per min (e.g., andante, moderator, allegretto, allegro, etc.), rhythm, melody, timbre, and/or harmony. In some embodiments, method 300 may include system computer device 110 generating or building historic records 220 and storing historic records 222 in historic database 210.

Method 300 may further include system computer device 110 building 320 a first training dataset by retrieving a first set of historic records 222 from historic database 210. The second set of historic records 222 may be associated with a plurality of different historic users 114. Method 300 may include system computer device 110 training 322 AB model 140, in a first session, using the first training dataset.

Method 300 may further include system computer device 110 building 324 a second training dataset by retrieving a second set of historic records 222 from historic database 210. The second set of historic records 222 are associated with a single, specific, or current, user 114. In other words, the second training dataset may be tailored to a specific user 114 such that AB model 140 trained, or re-trained, using the second training dataset, may be a user specific AB model 140.

Method 300 may include system computer device 110 re-training, tuning, and/or updating 326 AB model 140 using the second training dataset. In some embodiments, system computer device 110 trains AB model 140 using both the first training dataset and the second training dataset. In some embodiments, system computer device 110 trains AB model 140 using both the first training dataset and the second training dataset using weighting factors. For example, system computer device 110 may more heavily weight the second training dataset, associated with the specific user, as compared to the first training dataset, associated with the plurality of different users. In some embodiments, system computer device 110 may train AB model 140 using user selected inputs and/or adjusts or filters model outputs based upon user selected inputs.

In some embodiments, system computer device 110 may generate (e.g., trains, tunes, and/or retrains) a plurality of different AB models 140. AB models 140 may include one or more user specific AB model 140 training for a specific person or groups of persons. Groups of persons may refer to groups of users having similar and/or the same user data 234.

In some embodiments, method 300 may include system computer device 110 applying 328 one or more model input to trained AB model 140 to generate one or more model outputs. System computer device 110 may apply model inputs including, for example, user biometric data 232, user data 234, user selected inputs 230, and/or general data. Model outputs may include messages 240, playlist 242, and/or playlist profiles 244.

In some embodiments, method 300 may include system computer device 110 applying one or more updated model inputs to trained AB model 140 to generate one or more updated model outputs. For example, system computer device 110 may receive and or retrieve user biometric data 232, user data 234, and/or user selected inputs 230, continuously and or semi continuously, such that system computer device 110 may utilize the most up-to-date, current, and/or in real-time data to determine playlist.

In some such example, method 300 may include system computer device 110 receiving user selected input 230 including a target peak heart rate, an average heart rate, and an activity duration, associated with user intending to perform a cardio and/or running activity. User selected inputs 230 may include a selection of a playlist profile, such as a cardio profile. Method 300 may include system computer device 110 receiving and/or retrieving user biometric data. In some embodiment, system computer device 110 receiving user selected inputs 230 may initiate or automatically cause system computer device 110 to retrieve and receive user biometric data 232.

System computer device 110 may compare, and/or evaluate, user biometric data 232 to user selected inputs 230. For example, system computer device 110 may compare the user's heart rate to the target peak and/or average heart rate. System computer device 110 may utilize the comparison, or user biometric data 232, to determine playlist including one or more audio files 221. Playlist 242 may be intended to cause users biometric data 232 to match, or more closely match, the user selected inputs 230. After, or during, each audio file 221 being played on speaker 150 of user computer device 112, and then system computer device 110 may continuously, or semi-continuously, evaluate user biometric data 232 to determine new and updated playlists to be transmitted to user computer device 112. System computer device 110 may apply user biometric data 232 to AB model, iteratively, e.g., between audio files 221 played on speaker 150, to determine new and/or updated playlists in real-time.

In some embodiments, system computer device 110 may receive and/or retrieve data from user computer device 112 to determine what song is being played, what is the time of the song, the volume of the song, if the song is paused, and the like.

Exemplary Computer Network

Figure 5:
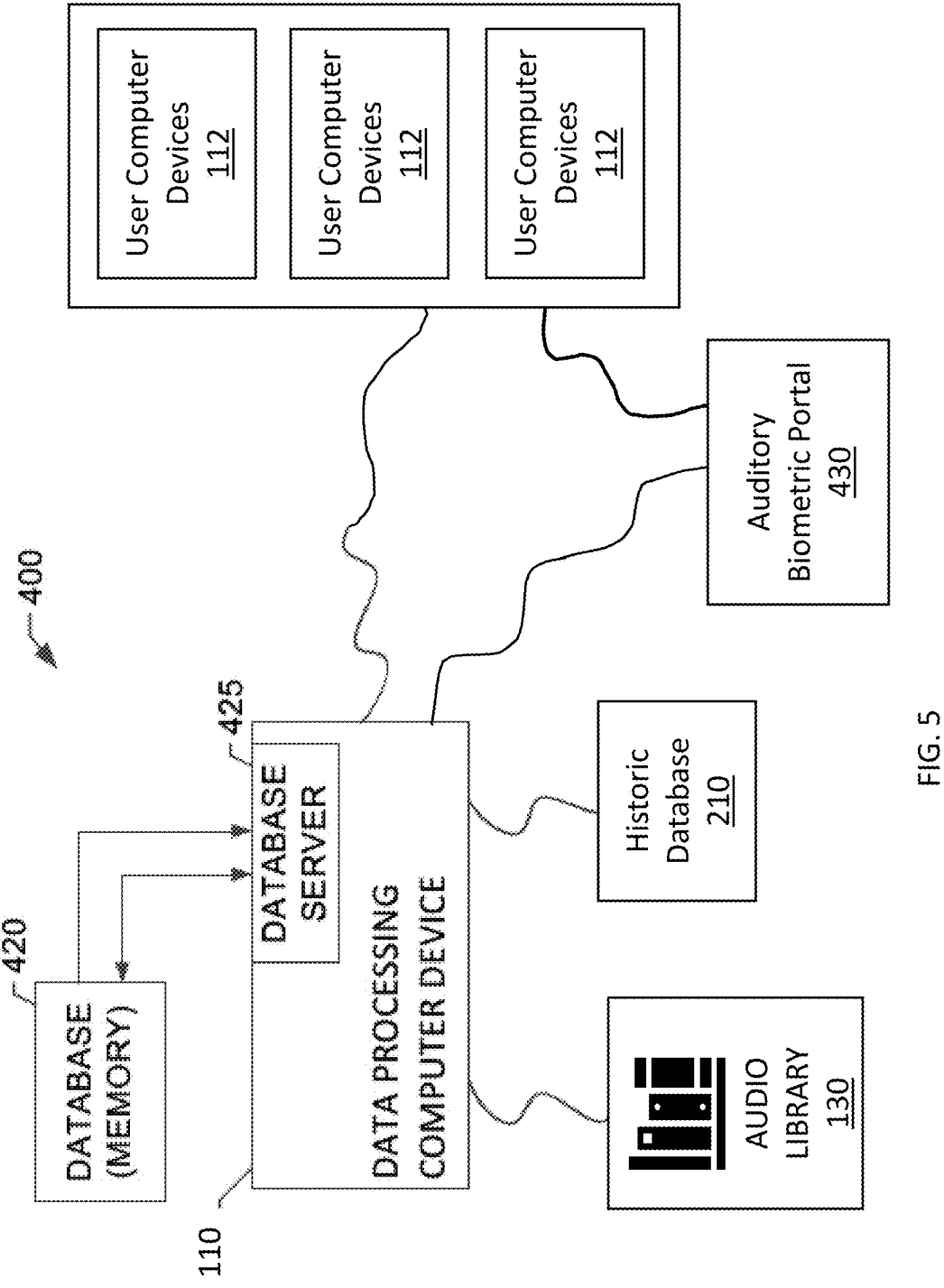
FIG. 5 illustrates a simplified block diagram of an exemplary system computer device shown in FIG. 1, in accordance with one embodiment of the present disclosure.

FIG. 5 depicts a simplified block diagram of an exemplary system 400 for implementing method 300 (shown in FIGS. 3 and 4). In the exemplary embodiment, system 400 may be used for system and method for data processing for auditory biometric applications. As described below in more detail, a system computer device 110 (shown in FIGS. 1 and 2) may be configured to: (a) receiving user biometric data detected by a sensor associated with a user computer device, wherein user biometric data is associated with a biometric state of a user; (b) applying user biometric data to a trained auditory biometric model to generate model outputs comprising the playlist file, wherein (i) the auditory biometric model may be trained using training data including a plurality of historic records associated with a plurality of historic users, and/or (ii) the historic records each include a historic audio file and historic user biometric data of a user associated with a user computer device that played the historic audio file; and/or (c) transmitting a playlist message including the playlist file to the user computer device for execution by the user computer device.

In some embodiments, user computer device 112 (shown in FIG. 1) may be a computer that includes a web browser or a software application which enables user computer device 112 to access remote computer devices, such as system computer device 110 using the Internet or other network as described herein. More specifically, user computer device 112 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer device 112 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment the user 114 (shown in FIG. 1) may be in communication with an auditory biometric portal 430 for accessing auditory biometric system 100 and/or system computer device 110. In some embodiments, auditory biometric portal 430 may be a web page or website. In other embodiments, user computer device 112 may be communicatively coupled to auditory biometric portal 430. User 114 may initiate a communication with auditory biometric portal 430 through user computer device 112. In yet another embodiment, auditory biometric portal 430 may be communicatively coupled with system computer device 110.

System computer device 110 may be part of a server system which includes database server 425. Database server 425 may be communicatively coupled to a database 420 that stores data. In the exemplary embodiment, database 420 is stored locally on system computer device 110. In an alternative embodiment, database 420 may be stored remotely from system computer device 110 and may or may not be decentralized. In the exemplary embodiment, user 114 may access database 420 via user computer device 112 by logging onto system computer device 110 as described herein.

System computer device 110 may be communicatively coupled with one or more user computer devices 112. In some embodiments, system computer device 110 may also be communicatively coupled with audio library 130. More specifically, system computer device 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Exemplary Client Device

Figure 6:
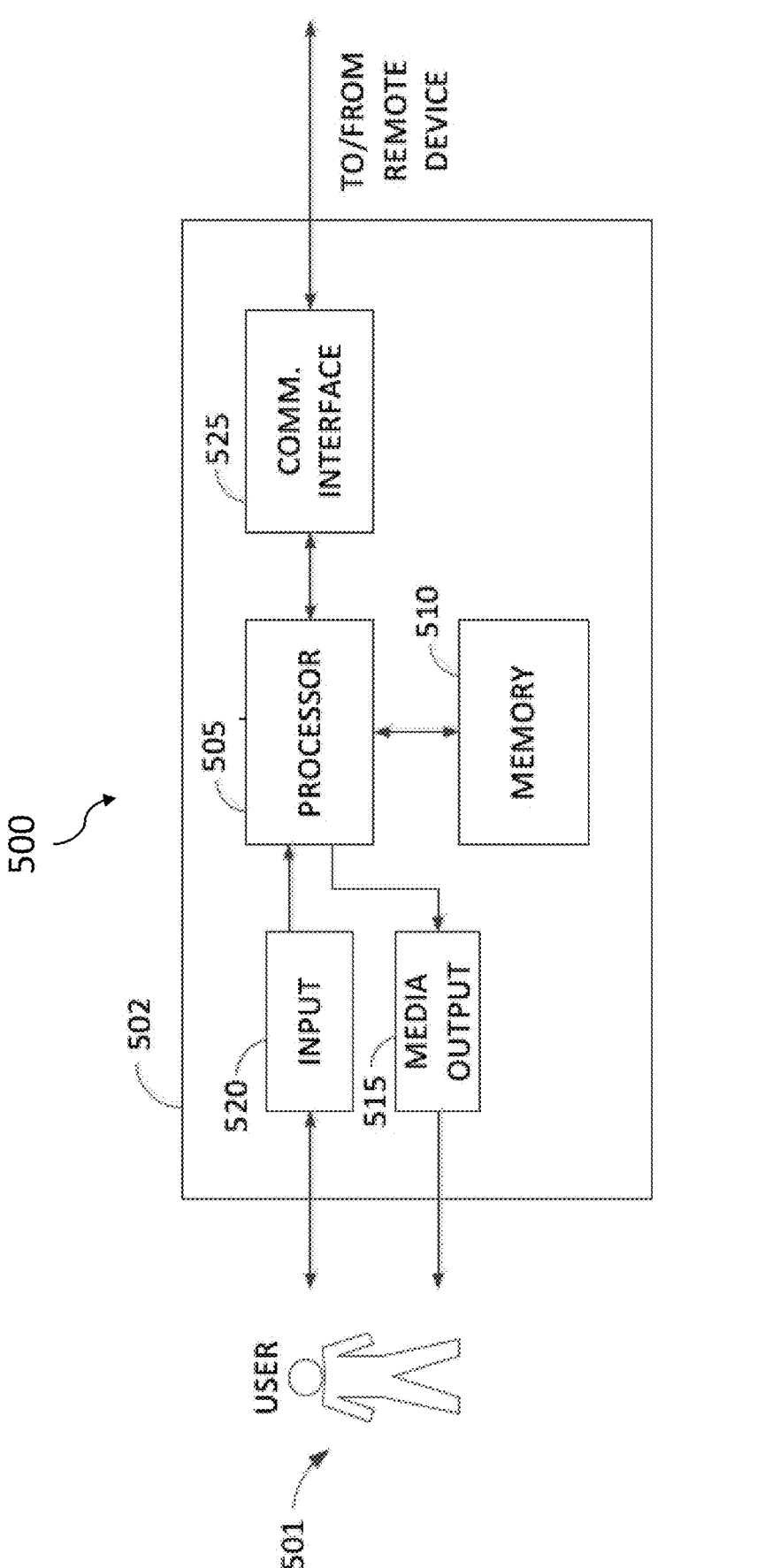
FIG. 6 illustrates an exemplary configuration of a client computer device shown in FIG. 1, in accordance with one embodiment of the present disclosure.

FIG. 6 depicts an exemplary configuration of a user computer device 502, such as user computer device 112 (shown in FIG. 2), in accordance with one embodiment of the present disclosure. User computer device 502 may be operated by a user 501. User computer device 502 may include, but may not be limited to, user computer devices 112. User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an online store interface for viewing and/or purchasing items, and/or a wallet application for managing payment information. In various embodiments, user computer device 502 may include an input device 520 for receiving input from user 501. User 501 may use input device 520 to, without limitation, select and/or enter one or more items about safe areas, reservations, and/or relocation times and dates.

Input device 520 may include, for example, a keyboard, a pointing device, a mouse, a stylus, a touch sensitive panel (e.g., a touch pad or a touch screen), a gyroscope, a microphone, an accelerometer, a position detector, a biometric input device, telematic sensors, and/or an audio input device. A single component such as a touch screen may function as both an output device of media output component 515 and input device 520.

User computer device 502 may also include a communication interface 525, communicatively coupled to a remote device such as system computer device 110. Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from system computer device 110. For example, instructions may be stored by a cloud service, and the output of the execution of the instructions sent to the media output component 515.

Exemplary Server Device

Figure 7:
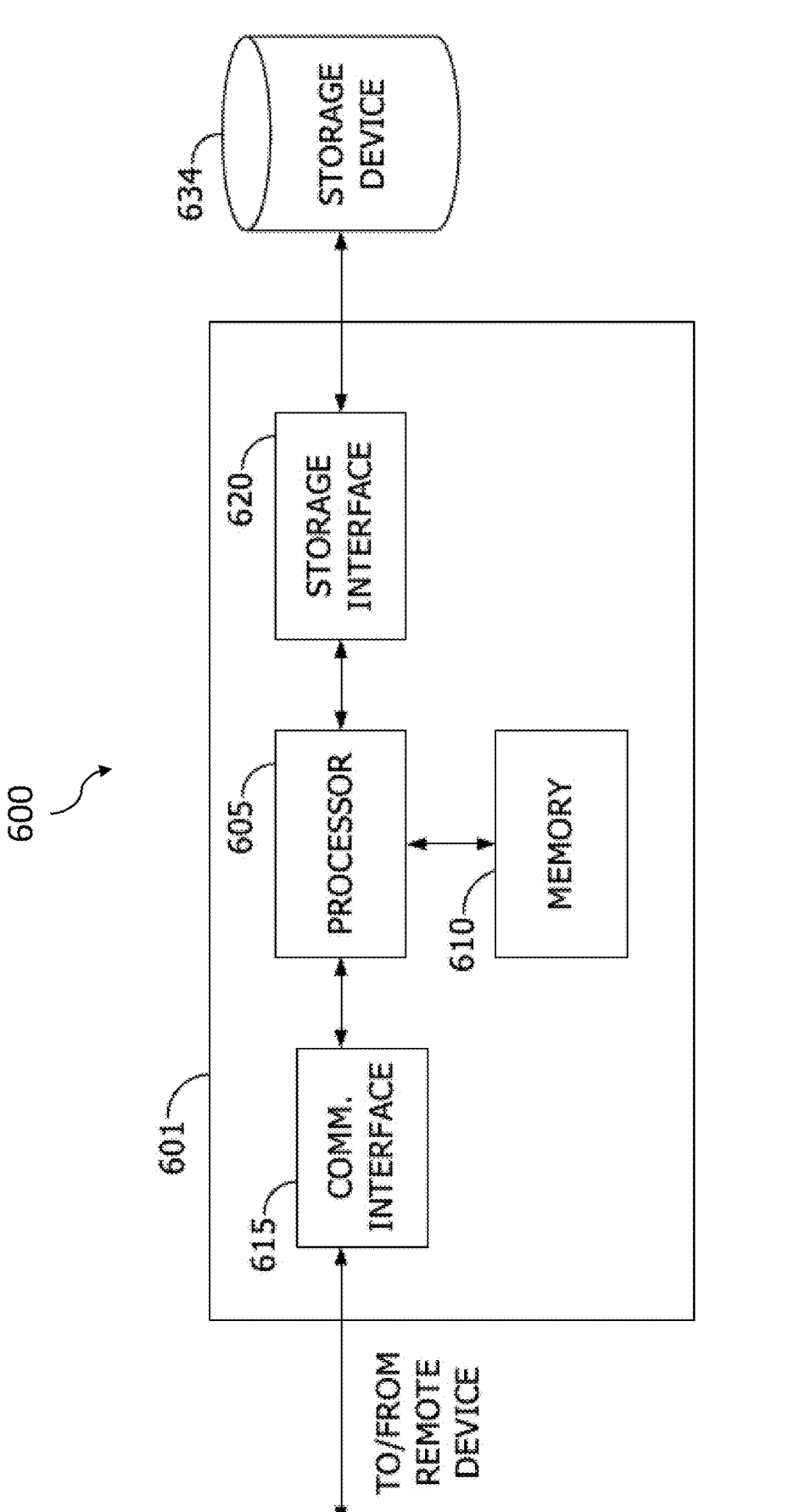
FIG. 7 illustrates an exemplary server configuration of the exemplary system computer device shown in FIG. 4, in accordance with one embodiment of the present disclosure.

FIG. 7 depicts an exemplary configuration 600 of a server computer device 601, in accordance with one embodiment of the present disclosure. In the exemplary embodiment, server computer device 601 may be similar to, or the same as, system computer device 110 (shown in FIG. 1). Server computer device 601 may include, but may not be limited to, system computer device 110 (shown in FIGS. 1 and 2), and database server 425 (shown in FIG. 5). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 may be capable of communicating with a remote device such as another server computer device 601, system computer device 110, and user computer devices 112 (shown in FIGS. 1 and 2) (for example, using wireless communication or data transmission over one or more radio links or digital communication channels. For example, communication interface 615 may receive requests from user computer devices 112 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 420 (shown in FIG. 4). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid-state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIGS. 3-4.

Exemplary Computer Device

Figure 8:
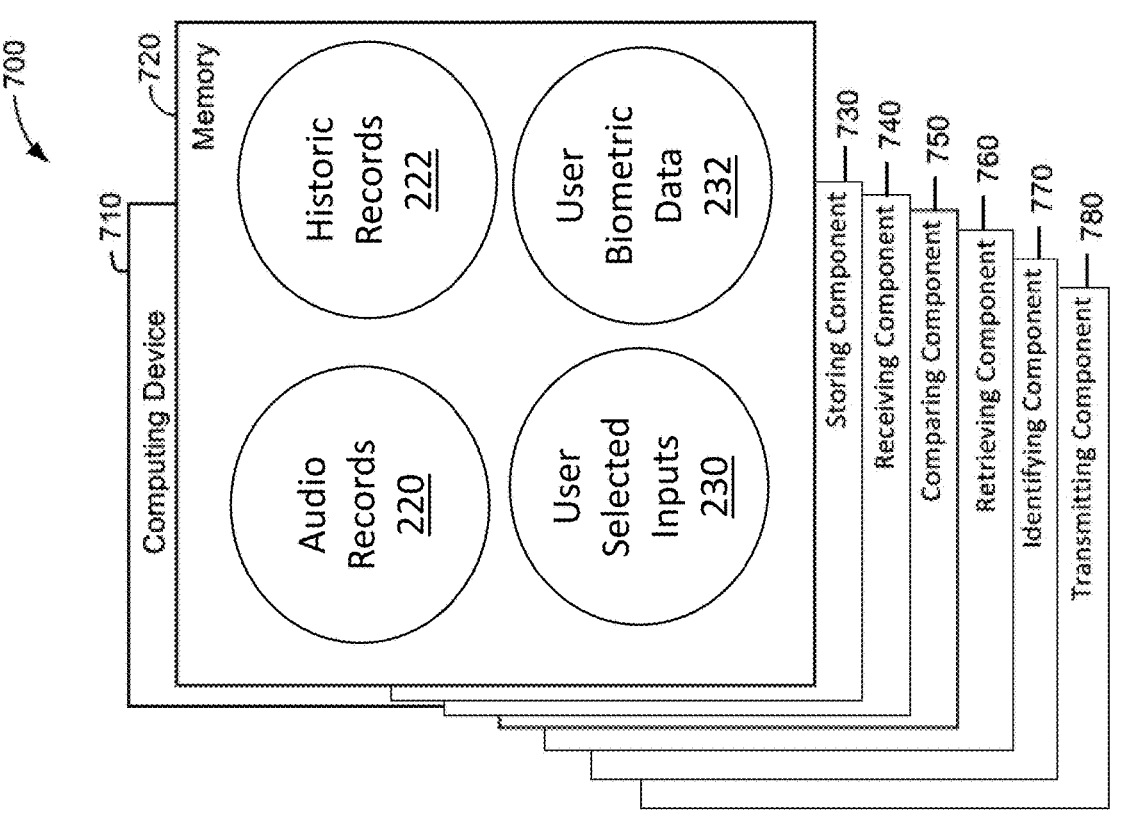
FIG. 8 illustrates a diagram of components of one or more exemplary computer devices that may be used in the system shown in FIG. 1.

FIG. 8 depicts a diagram 700 of components of one or more exemplary computer devices 710 that may be used in AB system 100 (shown in FIG. 1). In some embodiments, computer device 710 may be similar to system computer device 110 (shown in FIG. 1). Memory 720 may be coupled with several separate components within computer device 710, which perform specific tasks. In the exemplary embodiment, memory 720 may include audio records 220, historic records 222, user selected inputs 230 and/or user biometric data 232 (e.g., historic user biometric data). In some embodiments, memory 720 may be similar to database 210 and/or audio library 130 (shown in FIG. 2).

Computer device 710 may include the memory 720, as well as a storing component 730 for storing profile data for registered users and/or user biometric data. Computer device 710 may also include a receiving component 740 for receiving user biometric data 232. Computer device 710 may further include a comparing component 750 for determining if current user biometric data 232 is the same or similar to user selected inputs 230. Computer device 710 may include a retrieving component 760 for retrieving user data 234. Computer device 710 may also include an identifying component 770 for determining audio records 220, e.g., to be included in playlist 242. Computer device 710 may also include a transmitting component 780 to communicate with other internal and/or external components to at least transmit the result of comparing component 750. In some embodiments, transmitting component 780 may also transmit playlist 242, messages 240, and/or playlist profiles 244.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied, or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An auditory biometric system for outputting a playlist file comprising at least one audio file, the auditory biometric system comprising at least one processor, and at least one memory in communication with the at least one processor, the at least one processor programmed to:

receive user biometric data detected by a sensor associated with a user computer device, wherein user biometric data is associated with a biometric state of a user;

apply user biometric data to a trained auditory biometric model to generate model outputs comprising the playlist file, wherein the auditory biometric model is trained using training data including a plurality of historical records associated with a plurality of different historical users, wherein the historical records each include a historical audio file and historical user biometric data of a user collected while the historical audio file was being played; and transmit a playlist message including the playlist file to the user computer device for execution by the user computer device.

2. The auditory biometric system of claim 1, wherein the at least one processor is further programmed to:

receive a user selected input from the user computer device, wherein the user selected input includes at least one of a target biometric state, a playlist profile, an activity, or a duration of activity; and apply the user selected input and the user biometric data to the trained auditory biometric model to generate the playlist file.

3. The auditory biometric system of claim 1, wherein the user biometric data includes one or more of heart rate, heart rate variability, body or skin temperature, skin conductivity, skin moisture or sweat, breathing rate, blood oxygen levels, step rate/number, motion data, acceleration, speed, Global Positioning System data, blood pressure, $VO_2$ max, calories burned, step count, sleep/awake detection, chronotypes, circadian rhythm, electric heart rate or electrocardiogram.

4. The auditory biometric system of claim 1, wherein the at least one processor is further programmed to:

build a first training dataset including a plurality of historical records associated with a plurality of different historical users, wherein the plurality of historical records each include a historical audio file and historic user biometric data of a user collected while the historical audio file was being played; and train, in a first session, an auditory biometric model using the first training dataset to generate the trained auditory biometric model.

5. The auditory biometric system of claim 4, wherein the at least one processor is further programmed to:

build a second training dataset including a first plurality of historical records associated with a plurality of different historical users and a second plurality of historical records associated with a specific current user, wherein the historical records each include a historical audio file and historical user biometric data of a user collected while the historical audio file was being played; and train, in a second session, an auditory biometric model using the second training dataset to generate the trained auditory biometric model.

6. The auditory biometric system of claim 1, wherein the at least one processor is further programmed to:

build a training dataset including a plurality of historical records associated with a specific current user, wherein the historical records each include a historical audio file and historical user biometric data of the specific current user collected while the historical audio file was being played; and re-train an auditory biometric model using the training dataset to generate the trained auditory biometric model.

7. The auditory biometric system of claim 1, wherein the at least one processor is further programmed to:

receive updated user biometric data detected by the sensor associated with the user computer device, wherein updated user biometric data is associated with a current biometric state of a user;

apply the updated user biometric data to the trained auditory biometric model to generate model outputs including an updated playlist file, the updated playlist file including at least one song different from the at least one song of the previously generated playlist file; and transmit an updated playlist message including the updated playlist file to the user computer device.

8. The auditory biometric system of claim 1, wherein the at least one processor is further programmed to:

build a training dataset including a plurality of historical records associated with a plurality of different historical users and a plurality of historical records associated with a specific current user, wherein the historical records each include a historical audio file and historical user biometric data of a user collected while the historical audio file was being played, and wherein the plurality of historical records associated with the specific current user includes weighting factors that are greater than weighting factors for historical records associated with a plurality of different historical users; and train an auditory biometric model using the training dataset to generate the trained auditory biometric model.

9. The auditory biometric system of claim 8, wherein the historical records each include an audio record and historical user biometric data associated with the audio record, wherein the audio record includes at least one song and at least one metric of the song, wherein the at least one metric includes at least one of: genre, tempo, tempo range, rhythm, melody, timbre, and harmony.

10. The auditory biometric system of claim 1, wherein the at least one processor is further programmed to:

receive updated user biometric data detected by the sensor associated with the user computer device, wherein updated user biometric data is associated with a current heart rate of a user;

receive a user selected input from the user computer device, wherein the user selected input includes at least one of a target biometric state, the target biometric state including a target heart rate;

apply the updated user biometric data and the target heart rate to the trained auditory biometric model to generate model outputs including an updated playlist file, the updated playlist file including at least one song that is different from the at least one song of the previously generated playlist file, wherein the at least one different song has an increased tempo compared to the at least one song of the previously generated playlist file; and transmit an updated playlist file message including the updated playlist file to the user computer device.

11. The auditory biometric system of claim 1, wherein the at least one processor is further programmed to:

apply a time of day comprising a morning period to the trained auditory biometric model to generate model outputs including an updated playlist file, the updated playlist file including at least one different song that is different from the at least one song of the previously generated playlist file, wherein the at least one different song has an increased tempo compared to the at least one song of the playlist file; and transmit an updated playlist message including the updated playlist file to the user computer device.

12. The auditory biometric system of claim 1, wherein the at least one processor is further programmed to:

receive first updated user biometric data detected by the sensor associated with the user computer device, wherein the first updated user biometric data is associated with a heart rate of the user at a first time;

receive a user selected input from the user computer device, wherein the user selected input includes at least one of a target biometric state, the target biometric state including a target heart rate;

apply the first updated user biometric data and the target heart rate to the trained auditory biometric model to generate model outputs including a first updated playlist file, the first updated playlist file including at least one different song that is different from the at least one song of the previously generated playlist file, wherein the at least one different song has an increased tempo compared to the at least one song of the previously generated playlist file; and transmit a first updated playlist message including the first updated playlist file to the user computer device;

receive second updated user biometric data detected by the sensor associated with the user computer device, wherein the second updated user biometric data is associated with a heart rate of the user at a second time after the first time;

apply the second updated user biometric data and the target heart rate to the trained auditory biometric model to generate model outputs including a second updated playlist file, the second updated playlist file including at least one different song that is different from the at least one song of the first updated playlist file, wherein the at least one different song has an increased tempo compared to the at least one song of the first updated playlist file; and transmit a second updated playlist message including the second updated playlist file to the user computer device.

13. The auditory biometric system of claim 1, wherein the at least one processor is further programmed to:

receive user data detected by the sensor associated with a user computer device, wherein the user data comprises surrounding noise data detected by a microphone of the user computer device;

apply user data to a trained auditory biometric model to generate model outputs comprising the playlist file and an audio level; and transmit a playlist message including the playlist file to the user computer device and an audio level, wherein the playlist message includes instructions that when executed by the user computer device cause the user computer device to adjust a volume of a speaker to the determined audio level.

14. A computer-implemented auditory biometric method for outputting a playlist file comprising at least one audio file, the auditory biometric method implemented using a computer device including at least one processor in communication with a memory device, the method comprising, via the computer device and/or at least one processor:

receiving user biometric data detected by a sensor associated with a user computer device, wherein user biometric data is associated with a biometric state of a user;

applying user biometric data to a trained auditory biometric model to generate model outputs comprising the playlist file, wherein the auditory biometric model is trained using training data including a plurality of historical records associated with a plurality of different historical users, wherein the historical records each include a historical audio file and historical user biometric data of a user collected while the historical audio file was being played; and transmitting a playlist message including the playlist file to the user computer device for execution by the user computer device.

15. The method of claim 14, wherein the method further includes:

receiving a user selected input from the user computer device, wherein the user selected input includes at least one of a target biometric state, a playlist profile, an activity, or a duration of activity; and applying the user selected input and the user biometric data to the trained auditory biometric model to generate the playlist file.

16. At least one non-transitory computer-readable storage medium including computer-executable instructions embodied thereon for outputting a playlist file comprising at least one audio file, wherein when executed by at least one processor, the computer-executable instructions cause the processor to:

receive user biometric data detected by a sensor associated with a user computer device, wherein user biometric data is associated with a biometric state of a user;

apply user biometric data to a trained auditory biometric model to generate model outputs comprising the playlist file, wherein the auditory biometric model is trained using training data including a plurality of historical records associated with a plurality of different historical users, wherein the historical records each include a historical audio file and historical user biometric data of a user collected while the historical audio file was being played; and transmit a playlist message including the playlist file to the user computer device for execution by the user computer device.

17. The at least one non-transitory computer-readable storage medium of claim 16, wherein the computer-executable instructions cause the processor to:

receive a user selected input from the user computer device, wherein the user selected input includes at least one of a target biometric state, a playlist profile, an activity, or a duration of activity; and apply the user selected input and the user biometric data to the trained auditory biometric model to generate the playlist file.

18. The at least one non-transitory computer-readable storage medium of claim 16, wherein the user biometric data includes one or more of heart rate, heart rate variability, body or skin temperature, skin conductivity, skin moisture or sweat, breathing rate, blood oxygen levels, step rate/number, motion data, acceleration, speed, Global Positioning System data, blood pressure, $VO_2$ max, calories burned, step count, sleep/awake detection, chronotypes, circadian rhythm, electric heart rate or electrocardiogram.

19. The at least one non-transitory computer-readable storage medium of claim 16, wherein the computer-executable instructions cause the processor to:

build a first training dataset including a plurality of historical records associated with a plurality of different historical users, wherein the plurality of historical records each include a historical audio file and historical user biometric data of a user collected while the historical audio file was being played; and train, in a first session, an auditory biometric model using the first training dataset to generate the trained auditory biometric model.

20. The at least one non-transitory computer-readable storage medium of claim 16, wherein the computer-executable instructions cause the processor to:

build a second training dataset including a first plurality of historical records associated with a plurality of different historical users and a second plurality of historical records associated with a specific current user, wherein the historical records each include a historical audio file and historical user biometric data of a user collected while the historical audio file was being played; and train, in a second session, an auditory biometric model using the second training dataset to generate the trained auditory biometric model.

* * * * *